United States Patent Office 3,330,890
Patented July 11, 1967

3,330,890
FORMULATIONS FOR GUNNING REFRACTORIES
John P. Holt and Henry P. Day, Ladue, and Theodore Paul Cash, Bonne Terre, Mo., assignors to Valley Dolomite Corporation, St. Louis, Mo., a corporation of Missouri
No Drawing. Filed Apr. 1, 1963, Ser. No. 269,737
8 Claims. (Cl. 264—30)

This invention relates to an improvement in the formulations of granular refractories used for gunning application in lining and repairing linings of metallurgical furnaces, boilers and other heating units or furnaces.

In gunning refractories, normally there are provided three types of bonds. The first of these is intended to hold the refractory material in position as soon as it is applied; the second is an intermediate chemical bond (such as that formed by alkali silicates) which retains the refractory until the third, a permanent ceramic bond, is formed when the furnace is heated.

The present invention relates to an improved initial bonding agent and to refractory compositions having said bonding agent incorporated therein. Heretofore, mineral plasticizers have been used, but these have certain disadvantages which will be enumerated hereinafter. Other materials such as glues, sugars, asphalts, etc. have been tried, but have not been satisfactory. Recently certain synthetic organic materials, polyvinyl alcohols and cellulose carboxyethers, have been tried, but again have not proven to be completely satisfactory for this purpose.

The present invention contemplates the use of small amounts (up to about 2%) of a material selected from the class consisting of water soluble carboxy vinyl polymers and water soluble copolymers of vinyl and maleic anhydride in a gunning refractory composition. These materials form thick self healing gels which do not slump and which retain the refractory particles firmly in position on the furnace wall.

When refractories are gunned onto furnace surfaces, the refractory is mixed with controlled amounts of water and subsequently or simultaneously thrown by mechanical, hydraulic or pneumatic means onto the surface to be repaired or lined. Heretofore refractories applied by gunning have had incorporated therein from 1% to 5% or more of a mineral plasticizer, such as bentonite, clay, or fireclay. The function of the mineral plasticizer is to form, with added water, a gel or a sticky, viscous sol into which coarse fractions of the refractory (particularly those between 20 mesh Tyler and 3 mesh Tyler) will become embedded, prevented from bouncing away and thus retained on the surface of the furnace structure until intermediate chemical bonds and, later, permanent ceramic bonds become effective as heat is applied. Another purpose of the aforementioned gel or viscous sol is to inhibit slumping or falling away of thick sections of emplaced refractory from vertical or near vertical furnace structures before chemical and ceramic bonds can become effective.

Three major disadvantages of mineral plasticizers such as bentonite, clay, and fireclay have long been recognized.

(1) Such mineral plasticizers are by their chemical nature incompatible with basic and other refractories used in high temperature service and tend to form low melting point compounds, such as $4CaO \cdot Al_2O_3 \cdot Fe_2O_3$ (melting point, 2579° F.) which when heated to service temperatures in the neighborhood of 3000° F. drain away from the principal mass of the refractory, leaving a weak and porous structure behind. It is well recognized that many refractories can tolerate limited amounts of such low melting compounds when these refractories are used at moderate service temperatures, but at high temperatures it is equally well recognized in the art that the amounts of these compounds should be minimized.

(2) When a refractory patch which contains a mineral plasticizer like bentonite, clay, or fireclay is heated to a temperature slightly above the boiling point of water the gel or sol breaks down, liberating steam and forming a friable mass with almost no strength. Again a refractory mass can tolerate small amounts of such a weakened phase; however, it should be self-evident that such phase should be held to the barest minimum if optimum refractory performance is to be achieved.

(3) Mineral plasticizers need excessive amounts of water for activation. This excess water results in unwanted porosity after drying the emplaced refractory mass, a tendency for a newly-emplaced patch to pop off a hot furnace wall, and in the case of refractories containing lime and magnesia, a tendency to hydrate destructively.

In many previous unsuccessful attempts to substitute more suitable materials for the mineral plasticizers mentioned above, many materials such as glues, sugars, asphalt and petroleum products and coal tar products, silicates, sulfates and chromates have been tried. Although each gave a promise of success, they develop intolerable side effects; and/or do not form suitable gels, sols or solutions and/or do not form them rapidly enough to be effective; or, in the case of certain asphalt, petroleum and coal tar products which depend upon furnace heat to develop stickiness, the temperature of emplacement is critical and not under control of the operator. Thus satisfactory adherence is obtained only monmentarily as the furnace cools and then only by remote chance. In the case of most of these substances, so much plasticizer must be added that loci of weakness develop as these materials dry and/or burn away. As an example of intolerable side effects: under certain conditions some chromates explode violently when heated; some sulfates react with alkali silicates (commonly used in gun refractories as intermediate temperature chemical bonds) rendering them ineffective, and leaving the refractory substantially without strength during the critcial period of heating to service temperature.

We have discovered that a group of synthetic chemicals, known in the trade as "water-soluble resins," when added in extremely small amounts will perform the needed plasticizing function in gunning refractories exceedingly well without entailing the aforementioned undesirable or intolerable side effects. One measure of the effectiveness of all such materials is the degree to which they will tend to increase the consistency of water; or, conversely, if a certain level of consistency is desired, the more effective the substance the less of it need be mixed with a given amount of water to achieve this level. We determined through experiment that in the case of certain water-soluble resins about one-tenth as much of the synthetic water-soluble resin is needed as compared with mineral plasticizers. Furthermore, under controlled gunning conditions where percent rebound was used as a measure of the effectiveness of plasticizing additions, we discovered that only one-half as much of these water-soluble resins was needed as compared to the amount we had surmised necessary from the water-consistency tests described above. We are not completely certain why this is so, but offer the following possible explanation:

While making consistency tests of water solutions of water-soluble resins against mixtures of water and mineral plasticizers it was not practical to measure change during the relatively short period of time in which these substances dissolved and became (either through chemical reaction or gel formation) effective as thickeners. Rather, end results were noted.

However, during gunning, while using the type of equipment that is generally considered standard in metallurgical industries, refractory is blown dry through a nozzle where water is added. This mixture of water and refractory continues at high speed through a "shooting pipe" thence out into the air and almost immediately lands on the furnace structure to be repaired or lined. We estimate that the time elapsed between initial wetting of the refractory until it lands on the furnace structure is of the order of one second or less. Since the water-soluble resins are much more rapid in their action in raising the consistency of water, it is conceivable in the short time allotted for this reaction, a much larger percentage of the water-soluble resin becomes effective than does a mineral plasticizer such as bentonite, clay, or fireclay. This observed thickening probably is involved not only with viscosity, but also with a complex combination of rheological properties such as elasticity and thixotropy. This makes it difficult, if not impossible, to determine beforehand from measurements of viscosity alone or other commonly measured qualities whether or not a given substance in solution will work.

Another unexpected advantage of the use of water-soluble resins, as opposed to mineral plasticizers, is a sharp decrease in the minimum amount of water we find necessary to obtain proper moisture content of the refractory-water mixture. Again, we are not completely certain why this is so. However, this might be accounted for, in part at least, as follows: Water soluble resins actually dissolve in water, whereas mineral plasticizers do not. The latter absorb water molecules into their crystal structures and expand to form gels and/or sols. Since the whole refractory must be moist to achieve any worthwhile order of adherence in use, much of the water which enters the mineral crystal structure would seem to be prevented from carrying out its purpose of wetting the refractory. On the other hand, the water used to dissolve a water soluble resin would seem to be readily available to wet the refractory as well. Refractories compounded with appropriate water-soluble resins need approximately two-thirds as much water as those compounded with mineral plasticizers.

Not all water-soluble resins are suitable for our purpose, but several, among them some carboxy vinyl polymers and cross-linked ethylene-maleic anhydride copolymers are. These resins, in water solution, develop gel-like masses of high critical shear strength which are tolerant of the high pH levels that obtain within the bodies of moistened refractories containing alkali silicates, carbonates or other alkaline substances. The resins also are rapidly soluble under the gunning conditions hereinbefore set forth.

Some other water-soluble resins, for instance ordinary starches and sodium carboxy methyl cellulose, do not dissolve rapidly enough for use in gun refractories which are to be emplaced through usual pneumatic equipment and they are not effective enough to be practical if used in other types of equipment or by manual placement using a shovel. Also, they do not form the necessary gel-like structure. Methylenebisacrylamide-acrylamide copolymer produces rubber-like gels which, once formed, would increase instead of decrease rebound. Besides this expensive material requires an addition of such magnitude as to make the cost of the addition prohibitive. It also has some other undesirable qualities.

Suitable resins include Carbopol 941 manufactured by B. F. Goodrich Co. and DX–840–91 manufactured by Monsanto Chemical Co.

Carbopol resins are vinyl polymers (derived from acetylene, CH≡CH) to which carboxyl groups are attached to one-half of the carbon atoms. DX–840 resins are copolymers of ethylene and maleic anhydride.

(HOOCCH=CHCOOH)

When ethylene maleic anhydride copolymer resins are dissolved in water, the maleic anhydride groups form carboxyl groups and the basic structures of Carbopol and DX–840 resins in solution are alike except that the latter have a much more regular structure in that the carboxyl groups are attached in pairs with two unsubstituted carbon atoms between each pair.

The resins may be used in amounts of 0.01% to about 2% by weight of the dry ingredients in the refractory mass. If greater amounts are used, they are not deleterious, but the cost is prohibitive. The preferred amount of carboxy vinyl polymer is about 0.1% and the preferred amount of ethylene maleic anhydride copolymer is about 0.05%.

Below are the general structures of these two materials in water solution. The "$n$" subscripts indicate the repetitive nature of these polymers, which enable them to form very large molecules.

CARBOXY VINYL POLYMER

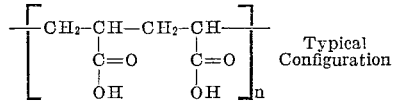
Typical Configuration

ETHYLENE MALEIC ANHYDRIDE COPOLYMER

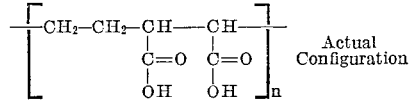
Actual Configuration

These resins in solution are acids. They require neutralization with a base before they develop useful rheological properties. The needed base in our formulation comes from the alkaline salts added to our gunning refractories. Both of the foregoing resins may have varying degrees of cross-linking which are not shown here. The crosslinking is important only in that it increases the viscosity of the compound and thus less of the highly cross-linked materials needs to be used.

Carboxy methyl cellulose (CMC) solutions are "pseudoplastic" in that their apparent viscosities decrease in a relatively uniform manner as the shearing stress used in making the viscosity determination is increased. On the other hand, solutions of the resins of the present invention are "thixotropic" because they form gels which do not break down until a critical shearing stress is reached. Thus they exhibit truly "plastic flow" characteristics. Beyond this stress the apparent viscosity drops off in the manner of pseudoplastic systems and continued agitation keeps the viscosity at a lower value. When agitation stops, the gel forms again almost instantly.

CMC solutions have rheological properties similar to heavy oils. Solutions of the present resins have physical properties like grape jelly, except that breaking up the jelly structure is not permanent as it is in the case of most jellies; with solutions of our resins, the breaks heal as soon as the agitation which produced them stops.

The importance of these differences between pseudoplastic and thixotropic substances becomes apparent when we examine their action in gunning refractories, and thinking of these substances as oils or jellies respectively, consider a stream of hard, heavy particles impinging on a mass with the consistency of heavy oil (CMC). The particles are captured and prevented from rebounding if the oil is viscous enough. However, the particles will tend to settle and the mass will slump in time, again depending upon the viscosity. On the other hand, a similar stream of particles, impinging upon a substance with a consistency of a self-healing jelly (the present resins) will be captured and held in place as the jelly re-forms. No settling of the larger particles will take place unless the critical shear stress of the jelly is exceeded.

It is not feasible to compare viscosities of thixotropic and pseudoplastic substances without specifying the degree of agitation used to measure the viscosities. However, if we measure the viscosities of 1% solutions of the three resins in a pH 10 environment (slurries of our gun refractories are this basic) at a temperature of 25° C. using a Brookfield viscometer running at 20 r.p.m., the following results were obtained:

|  | Centipoises |
|---|---|
| CMC solution | 13,000 |
| Carboxy vinyl polymer solution | 12,000 |
| Ethylene maleic anhydride copolymer solution | 50,000 |

The foregoing results show that CMC and carboxy vinyl polymer solutions have about the same final viscosity after some minutes of stirring. However, CMC solutions do not form gels and CMC takes much longer to go into solution. We have found that we can use 1/10 as much of a carboxy vinyl polymer and 1/20 as much of an ethylene maleic anhydride copolymer as is necessary when using CMC in gunning refractories. This may be explained by the faster solution rates of these resins, and their strong thixotropic characteristics.

We measure the relative solution rates and the effects of pH on the solutions of CMC, carboxy vinyl polymers and ethylene maleic anhydride copolymers in the following manner:

(a) 1 gram amounts of each of the three ingredients are mixed into three beakers each containing 100 cc. of water with constant electric powered stirring. The carboxy vinyl polymers and the ethylene maleic anhydride copolymers thicken slightly in less than one minute. The CMC does not completely dissolve in 10 minutes, and thickens slightly.

(a′) NaOH pellets are dropped into each of the beakers to raise the pH to approximately pH 10–11. The ethylene maleic anhydride copolymers and the carboxy vinyl polymers form very thick thixotropic gels almost instantly, whereas the CMC solution is not affected.

(b) The resins and NaOH are stirred into water as before except that NaOH is mixed with each of the resins at the time of its introduction into the water. Carboxy vinyl polymers and ethylene maleic anhydride copolymer solutions form very thick gels in about 40 seconds whereas the CMC solution only slightly thickens after 10 minutes. The aforementioned gels are thick enough for gunning refractory use almost instantaneously after the resin is mixed with water in the presence of NaOH. Ordinary gunning refractories attain a pH of 11+ in 1–3 seconds after being mixed with water.

The foregoing demonstrates that CMC solutions do not form a gel under any conditions; CMC is not readily soluble in water; that carboxy vinyl polymers and maleic anhydride copolymers form thixotropic gels under very alkaline conditions; and that even high percentage solutions of carboxy vinyl polymers and maleic anhydride copolymers are very rapidly soluble in water as compared to CMC solutions.

There is no method, standard or particular, of which we know to measure the viscosity of the refractories after they have been mixed with appropriate amounts of water. Effectiveness of the additions as we judge them are measured in terms of how much refractory can be "built out" from a nearly vertical surface and how much rebound is produced (or conversely what is the percentage of adherence of the dry refractory). In one of our tests we attempted to keep gun's hopper and line pressures constant (25 and 50 p.s.i.), specify length of shooting pipe (10 ft.), distance from end of pipe to target (10 ft.), tilt of target (8°) and amount of material shot (400 lbs.). The target is constructed in the form of a tray 48″ square with 4″ sides. It is lined with galvanized sheet steel. The following are results of a typical test.

| Gun Refractory Plasticizing Additive | Max. Build-up before Slumping (in.) | Percent Adherence |
|---|---|---|
| No Additive | 2 | 73.7 |
| 0.1% Carboxy Vinyl Polymer | 6 | 74.6 |
| 0.5% Ethylene Maleic Anhydride Copolymer | 7 | 78.7 |

In this test, the maximum build-up was measured. Also, a small (2″) build-up may be made and the rebound measured. In this case, much larger percentage adherence of the refractories containing these water-soluble resins is obtained.

Following are examples of gun refractories made with water-soluble resins as plasticizers:

*Example No. 1*

From kiln-run dead-burned dolomite we screen either minus 6 mesh or minus 10 mesh (Tyler Standard) fractions with the following typical chemical analysis:

| | Percent |
|---|---|
| $SiO_2$ | 1.5 |
| $Fe_2O_3$ | 7.5 |
| $Al_2O_3$ | 0.8 |
| CaO | 56.0 |
| MgO | 34.2 |

We grind a dead-burned magnesite clinker to essentially minus 65 mesh (Tyler Standard). Two typical chemical analyses of such clinkers are as follows:

| | No. 1, Percent | No. 2, Percent |
|---|---|---|
| $SiO_2$ | 5.0 | 1.8 |
| $Fe_2O_3$ | 5.2 | 0.4 |
| $Al_2O_3$ | 2.0 | 0.3 |
| CaO | 1.8 | 1.8 |
| MgO | 86.0 | 95.7 |

We also grind separately to essentially minus 65 mesh (Tyler Standard), or obtain commercially already ground, an anhydrous alkali silicate and/or glass; or, obtain commercially, a hydrated alkali silicate and/or glass whose fineness is approximately the same as the minus 65 mesh magnesite referred to.

Alkali silicates of the hydrated type are useful when gunning hot furnace walls because a relatively minor increase in temperature causes them to dissolve in their own water of crystallization. A further moderate increase in temperature evaporates the moisture. The result of this is that an initial layer of fine refractory particles becomes "glued" to the hot furnace wall. This enables successive layers of refractory to be built up because it insulates the hot wall from the successive layers for a long enough time so that the effects of the plasticizers described in this application can be realized. Were it not for this initial insulation, the wall would have to be cooled before successive layers are built up because all these plasticizers are destroyed at moderately high temperatures (below 500° F.).

When hydrated silicates (or possibly some other similar agents) are not used, the wall must be cooled first. This is generally done by spraying it with water or simply by wasting enough refractory to do this cooling.

About 1–5% of the silicate is used preferably.

Soluble alkali silicates give green strength to the refractory and ground glass (an insoluble silicate) gives no green strength, but will give strength when melted. Alkali silicates also give melted strength.

The above coarse refractory fraction (dead-burned dolomite), fine refractory fraction (dead-burned magnesite) plus the sodium silicate (and sometimes other special additives) are blended together dry with a water-soluble resin in an intensive-type mixer. Blending must be done carefully to achieve a homogeneous mixture and to minimize subsequent segregation. After this the refractory product is packaged for shipment.

Alternatively, the sodium silicate and the water-soluble polymer may be ground with the magnesite to form a single, but complex, fine fraction which then is dry-blended with the dolomite coarse fraction. However, if proper care is taken to insure a homogeneous blend, the order or manner in which the various substances are blended does not matter.

We combine the dead-burned dolomite, the ground magnesite, the ground or otherwise pulverized sodium silicate and a water-soluble resin in the following proportions:

*Example No. 1(a)*

| | Percent |
|---|---|
| Minus 6 mesh dead-burned dolomite | 70.4 |
| Minus 65 mesh magnesite | 25.5 |
| Minus 65 mesh sodium silicate | 4.0 |
| Water-soluble carboxy vinyl polymer | 0.1 |

*Example No. 1(b)*

| | |
|---|---|
| Minus 10 mesh dead-burned dolomite | 70.40 |
| Minus 65 mesh magnesite | 25.55 |
| Minus 65 mesh sodium silicate | 4.00 |
| Water-soluble ethylene maleic anhydride copolymer | 0.05 |

*Example No. 1(c)*

| | |
|---|---|
| 5½ x 20 mesh magnesite | 55.00 |
| Minus 20 mesh magnesite | 20.95 |
| Minus 65 mesh magnesite | 20.00 |
| Minus 65 mesh sodium silicate | 4.00 |
| Water-soluble ethylene maleic anhydride copolymer | 0.05 |

Other gun refractories comprised of refractory chrome ore, quartz, fireclay, zircon, ganister, mullite, alumina, and other refractory grains can be compounded in a similar manner with an appropriate water soluble resin and other substances to make excellent gun refractories. As in Examples 1(a) and 1(b), mixtures of two or more refractory oxides may be used for such purposes as, for instance, to control shrinkage or coefficient of thermal expansion. Small amounts of other chemical additives may be needed to control sintering or other properties not directly related to gunning qualities.

Other methods of applying the refractories may be employed: for instance, use of a type of refractory gun which shoots a pre-mixed slurry, or use of another type of refractory gun which shoots a pre-mixed moistened mass, or by manually emplacing a moistened mass by means of a shovel. In these cases, the rapid solubility of the water-soluble resins is not greatly helpful. However, they offer the distinct advantages of requiring considerably less water and substituting a ceramically compatible substance for one that is not.

This invention is intended to cover all changes and modifications of the examples of the invention herein chosen for purposes of the disclosure, which do not constitute departures from the spirit and scope of the invention.

What is claimed is:

1. A basic refractory gunning composition consisting essentially of about 55% to 70% of a coarse basic refractory selected from the group consisting of dolomite and magnesite having a particular size of from 3 to 20 mesh, about 20% to 26% —65 mesh magnesite, about 1% to 5% —65 mesh sodium silicate and from about 0.05% to about 0.2% water soluble ethylene maleic anhydride copolymer, said copolymer substantially instantaneously forming a thixotropic gel when mixed with water in a refractory gunning apparatus and retaining the refractory particles without slumping when gunned onto a furnace wall.

2. A process of lining furnace walls and the like including the step of adding water to the refractory composition of claim 1, and applying the resultant mass to the wall as a thixotropic gel wherein the refractory particles are firmly embedded and which does not slump away from the wall upon standing.

3. A basic refractory gunning composition consisting essentially of about 70% —10 mesh dead burned dolomite, about 25% —65 mesh magnesite, about 4% sodium silicate, about 0.05% to about 0.1% water soluble ethylene maleic anhydride copolymer, said copolymer substantially instantaneously forming a thixotropic gel when mixed with water in a refractory gunning apparatus and retaining the refractory particles without slumping when gunned onto a furnace wall.

4. A method of lining furnace walls and the like comprising the steps of mixing water with the composition of claim 3, and gunning the resultant mass to the wall as a thixotropic gel wherein the refractory particles are firmly embedded and which does not slump away from the wall upon standing.

5. A basic refractory gunning composition consisting essentially of about 70% —6 mesh dead-burned dolomite, about 25% —65 mesh magnesite, about 4% —65 mesh sodium silicate and from about 0.05% to 0.1% water-soluble ethylene maleic anhydride copolymer, said copolymer substantially instantaneously forming a thixotropic gel when mixed with water in a refractory gunning apparatus and retaining the refractory particles without slumping when gunned onto a furnace wall.

6. A method of lining furnace walls and the like comprising the steps of mixing water with the composition of claim 5, and gunning the resultant mass to the wall as a thixotropic gel wherein the refractory particles are firmly embedded and which does not slump away from the wall upon standing.

7. A basic refractory gunning composition consisting essentially of about 55% 5½ x 20 mesh magnesite, about 21% —20 mesh magnesite, about 20% —65 mesh magnesite, about 4% —65 mesh sodium silicate, and about 0.05% to about 0.1% water soluble ethylene maleic anhydride copolymer, said copolymer substantially instantaneously forming a thixotropic gel when mixed with water in a refractory gunning apparatus and retaining the refractory particle without slumping when gunned onto a furnace wall.

8. A method of lining furnace walls and the like comprising the steps of mixing water with the composition of claim 7, and gunning the resultant mass to the wall as a thixotropic gel wherein the refractory particles are firmly embedded and which does not slump away from the wall upon standing.

References Cited

UNITED STATES PATENTS

| 2,699,407 | 1/1955 | Martens | 260—29.6 |
| 2,745,813 | 5/1956 | Logemann | 260—29.6 |
| 2,847,314 | 8/1959 | Fisher | 260—29.6 |
| 3,086,876 | 4/1963 | Griggs et al. | 106—61 |
| 3,145,188 | 8/1964 | Martinent et al. | 260—29.6 |
| 3,193,402 | 7/1965 | Rusoff et al. | 106—58 |
| 3,210,205 | 10/1965 | Shurty | 106—61 |

MURRAY TILLMAN, *Primary Examiner.*

N. F. OBLON, J. L. WHITE, *Assistant Examiners.*

UNITED STATES PATENT OFFICE
CERTIFICATE OF CORRECTION

Patent No. 3,330,890                                July 11, 1967

John P. Holt et al.

It is hereby certified that error appears in the above numbered patent requiring correction and that the said Letters Patent should read as corrected below.

Column 8, after line 60, add the following reference:

729,057     5/1955     Great Britain

Signed and sealed this 30th day of July 1968.

(SEAL)
Attest:

Edward M. Fletcher, Jr.                      EDWARD J. BRENNER
Attesting Officer                             Commissioner of Patents